(12) United States Patent
Lee

(10) Patent No.: US 6,980,920 B2
(45) Date of Patent: Dec. 27, 2005

(54) EMBEDDED SENSOR SYSTEM FOR TRACKING MOVING OBJECTS

(75) Inventor: Teck Heng Lee, Singapore (SG)

(73) Assignee: Nanyang Polytechnic, Singapore (SG)

( * ) Notice: Subject to any disclaimer, the term of this patent is extended or adjusted under 35 U.S.C. 154(b) by 85 days.

(21) Appl. No.: 10/695,913

(22) Filed: Oct. 30, 2003

(65) Prior Publication Data

US 2004/0093181 A1 May 13, 2004

(30) Foreign Application Priority Data

Nov. 1, 2002 (SG) ................................ 200206610

(51) Int. Cl.[7] ....................... G01C 17/00; G01B 15/00; G01P 9/00
(52) U.S. Cl. ....................... 702/150; 702/142; 702/155; 73/510
(58) Field of Search ................................ 702/150, 155, 702/142, 149, 66, 67; 73/488, 510

(56) References Cited

U.S. PATENT DOCUMENTS 6,272,443 B1 * 8/2001 Motzko ....................... 702/143

2003/0074966 A1 * 4/2003 Fukumura et al. ............ 73/488
2003/0128153 A1 * 7/2003 Paradie et al. ................. 342/70

* cited by examiner

Primary Examiner—John Barlow
Assistant Examiner—Meagan S Wallling
(74) Attorney, Agent, or Firm—Lawrence Y.D. Ho & Associates

(57) ABSTRACT

A method and apparatus describing a device for tracking moving objects or persons are taught. The invention is an embedded system using a series of sensors such as light sensors along a passageway to determine some movement characteristics such as number, size, direction, speed and position of objects or people along the passageway. One embodiment of this invention is in fare gates for public transport systems. Another aspect of this invention is the algorithm that determines the movement characteristics using the overlaps or intersections of rising edge, on state, falling edge and off state of signals from the sensors to determine the movement characteristics of objects or humans. The simplicity and robustness of the algorithm allow implement of the invention with inexpensive programmable logical controllers without the need of control by expensive computers. This invention also avoids the attendant disadvantages of other systems using cameras, computer vision or mechanical sensors.

16 Claims, 5 Drawing Sheets d<w<2d w>2d $d<w<2d$ $w>2d$

EMBEDDED SENSOR SYSTEM FOR TRACKING MOVING OBJECTS

FIELD OF THE INVENTION

The present invention relates to an embedded system for detecting and tracking objects moving along a series of sensors.

In particular, this invention relates to a stand-alone system that can count, detect and track humans moving in single file along passageways.

BACKGROUND OF THE INVENTION

At present, there are devices and systems that can detect and count human traffic, in shopping malls or terminal stations of various public transportation vehicles. These systems make use of overhead sensors across wide aisles of several meters or machine vision algorithms to interpret camera images.

However, these conventional systems are mainly used to gather passenger or consumer preference statistics and are not for use in controlling automatic fare gates.

Systems that are used to monitor and control fare gates may employ underfoot (carpet) sensors or light beams. On the other hand, simpler systems may utilize light sensors only as a safety measure against closing a barrier on a person and to monitor entries and exits via the fare gates.

The prior art cited have the disadvantages of being costly and are complex to maintain. Systems utilizing camera systems also require sufficiently bright lighting. The idea of being captured visually by cameras may be considered intrusive by some people. Systems employing underfoot detectors have the disadvantage in high mechanical wear and tear of the detectors.

Currently, a fare gate system used is that of a passenger with a valid fare card activating the opening of the barrier of a fare gate in order to gain access to the boarding platform. Such a system is slow as it takes time for the gate to open and close between each passenger passing through the fare gate.

In addition, each fare gate allows passage in only one direction until human input changes it. Thus, if higher throughput is desired in such a system, more fare gates (and hence increase floor area for these gates) are required.

One way to overcome the above limitations is to have fare gates that remain open until an invalid fare card is detected. To keep costs down, it is desirable to control and monitor these fare gates with simple, robust embedded sensors systems that are not subject to wear and tear, and which can be inexpensively retrofitted into existing fare gates.

SUMMARY OF THE INVENTION

In one aspect, the present invention is an embedded system to monitor and track an object or person moving along a series of sensors so as to derive information regarding the movement of the object or person and then to effect one or more actions based on the derived information.

In another aspect, the present invention provides of method of detecting and comparing the four states (rising edge, on, falling edge and off) of these sensors to allow a processor to determine the size, speed, direction and position of a person or object moving along a series of sensors.

BRIEF DESCRIPTION OF THE DRAWINGS

The present invention will now be briefly described, by way of example, with reference to the drawings of which:

FIG. 7 is for an object whose size w is greater than 2d;

FIG. 10 is for an object whose size w is greater than 2d;

DETAILED DESCRIPTION OF THE DRAWINGS

An embodiment of the invention is described, together with the principle of operation. In the following description, details are provided to describe the preferred embodiment. It shall be apparent to one skilled in the art, however, that the invention may be practiced without such details. Some of these details may not be described at length so as not to obscure the invention.

The invention itself will first be mentioned, followed by the capabilities of its various embodiments. Then, definitions of terms used are given before examples of various situations possible are described in detail to teach the invention.

The heart of the present invention is this phenomenon of intersecting states of signals (rising edge, on, falling edge and off) given by the sensors as an object passes by. One such intersection is circled in FIG. 2.

Figure 2:
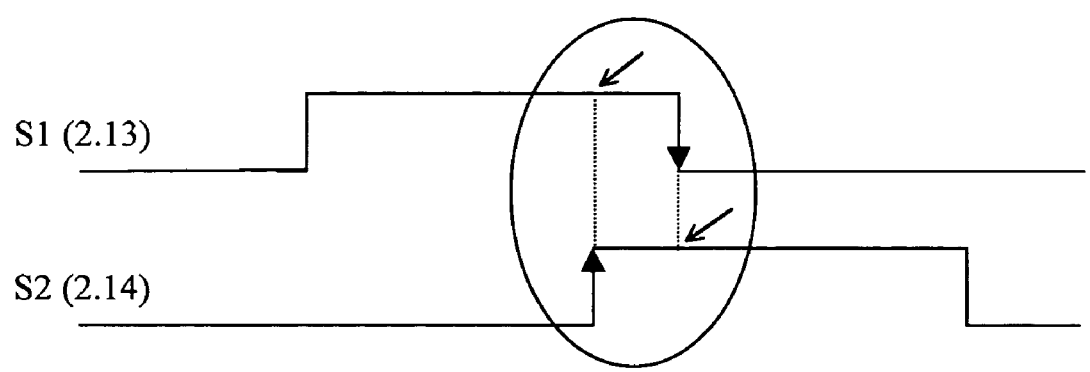
FIG. 2 the timing diagram for a two-sensor system showing characteristic signals generated by the two sensors for an object described in FIG. 1.

The intersection of signals such as that seen in FIG. 2 is used to determine the characteristics (such as size and direction of movement) of the person or object passing by the sensors. From the combinations of intersections possible, information regarding the object passing by the sensors may be obtained.

Some examples of intersections of signals to be expected will be described. Based on such information, actions may be effected by output devices.

It will be appreciated by anyone skilled in the art that the present invention, being based on this phenomenon of intersecting signals, is simple and robust.

The various embodiments of the present invention exploit this phenomenon to derive the various capabilities of the system.

The invention comprises an embedded stand-alone, system sensor system and accompanying algorithms. The invention can detect, count and track humans moving along a passageway. It also has the capability to safely control one or more barriers along the passageway to permit or prevent access by people through this aisle.

With one embodiment of such a system, passengers with valid paid fare cards may freely enter and exit via unobstructed gates controlled by this system. Barriers are only activated when the system does not detect a valid fare being paid or deducted.

The system of the present invention can also prevent cheating by being able to discriminate between single persons and two or more persons trying to enter the fare gate by moving together as a tight group so as to avoid paying more than one fare.

Another embodiment of the present invention may also be used to control bi-directional fare gates. When there is a person in the passageway moving in one direction (say, into the station), such a fare gate may automatically close off access to the passageway from the other end by activating a barrier at the other end. Thus a person attempting to leave the station via the same passageway will be prevented from doing so when another person is entering the station and is already in the passageway.

Such a system can autonomously change the permitted direction of movement through its passageways. A bank of such passageways may appear to dynamically respond to direction of human movement and flow as more gates will permit movement in one direction, based simply on the majority of passengers either entering or leaving the station at different times of the day.

All this is possible without human intervention in the present invention.

The present invention requires only a simple programmable logic controller (PLC) to control barriers or other output devices and may be readily and inexpensively retrofitted into existing fare gate.

While the invention is an embedded stand-alone system, its capabilities may be readily scaled up or upgraded by modifying the controller program, connecting other types of input and output devices to it, connecting to a higher level controller or to a central computer when necessary.

In this invention, the speed and size of the person, or rather, the resolution of the speed and size, is relative to the interval or distance between adjacent sensors.

The algorithms, elements of the present invention, are divided into two categories: the first for a paired sensor input system and the second for a system that compares signals from three adjacent sensors (a triplet of sensors).

For a series of sensors, each sensor may function simultaneously both as the first or second sensor in systems employing the paired sensor algorithm. Except for the sensors at the extreme ends of the passageway, each sensor may also act simultaneously as the first, second or third sensor in the algorithm for the three sensor system.

While the paired or two-sensor system works well, a three-sensor or sensor triplet system allows finer resolution of the moving objects. A three-sensor system can better discriminate the body of a person from smaller objects such as his or her swinging arm and hand when that person moves along the sensors.

In this application, the terms "passageway" and "aisle" are used interchangeably as they refer to the same thing: a passage that is wide enough for only one person to pass at a time. When an object or person passing passes by or passes along the sensors, that the sensors sense the object or person and are triggered to send signals to the processor.

In this application, the terms "sensor" and "detector" as well as the corresponding verbs "sense" and "detect" are used interchangeably.

The signals that are sent by the sensors may consist of either one of the following four states: a rising edge state, an on state, a falling edge state and an off state.

Here, the forward direction is taken to be from left to right and the reverse direction is from right to left. When describing the sensor system and the figures, the terms "person" and "object" mean the same thing and they are moving along the passageway equipped with the sensor series.

Through-beam light sensors are described here but other sensors such as retro-reflective type light sensors (systems that use a reflective surface) or diffused-reflective systems (using light reflected off the object itself as well as other sensors or detectors based on electromagnetic energy may be used without departing from the scope or spirit of this invention.

Each through-beam sensor receives a beam of light from a light source aligned with it on the opposite wall of the passageway. As a person enters the passageway, he blocks and interrupts the light beams on one side of the wall. The sensors "sense" him and trigger output signals to the processor.

There are four possible states for the signals sent by the sensor to the processor: a rising edge state as an object begins to block a sensor, an on state as the object is blocking the sensor, a falling edge state as the object blocking a sensor moves past and unblocks the beam, and an off state, when the light beam is unblocked.

The distance or interval d of adjacent sensors is based on the dorso-ventral (back to front) thickness of an average person. This is typically 18 to 20 cm but this may be readily varied to account for clothing or adjusted to suit anthropomorphic norms for the population in which the invention is applied.

Alternatively, these passageways may come in more than one width to accommodate people of different sizes and the intervals between adjacent sensors may be adjusted accordingly. That is, a passageway for people with larger body frames may be both wider and have larger intervals for the sensors as well. A larger range of intervals from 16 to 30 cm should cover most human frame sizes.

Figure 12:
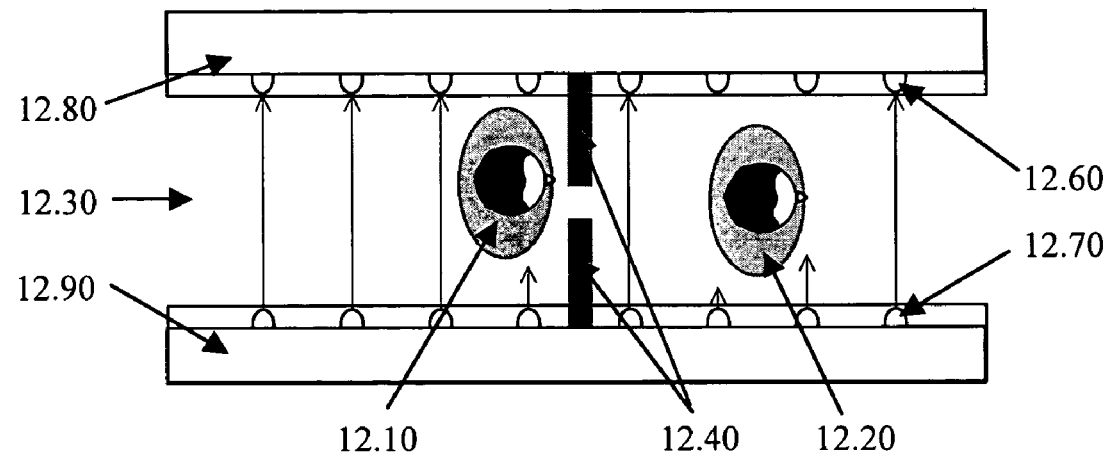
FIG. 12 shows the plan view of the preferred embodiment of the invention applied in an automatic fare gate with two persons along the passageway, and a motorized barrier activated between them.

FIG. 12 illustrates the present invention. The figure shows the top view of the preferred embodiment of the invention in an automatic fare gate. Two persons 12.10 and 12.20 are moving in a passageway 12.30 controlled by a series of eight sensors with a motorized barrier 12.40 after the fourth sensor.

The width of the passageway is delimited by the two walls 12.80 and 12.90 and only allows one person to enter and move within it but do not permit two or more persons to move abreast of each other.

By comparing the signals generated by the sensors either in pairs or in triplets of sensors, the algorithms of the present invention may be used to determine the movement characteristics of the person blocking the sensors such as the size (dorso-ventral thickness) of the person, his speed, position on the passageway and direction of travel. Subsequently, the controller may send signals to output devices such as gate barriers or data loggers based on pre-determined rules on whether to allow or prevent access to the person.

Figure 1:
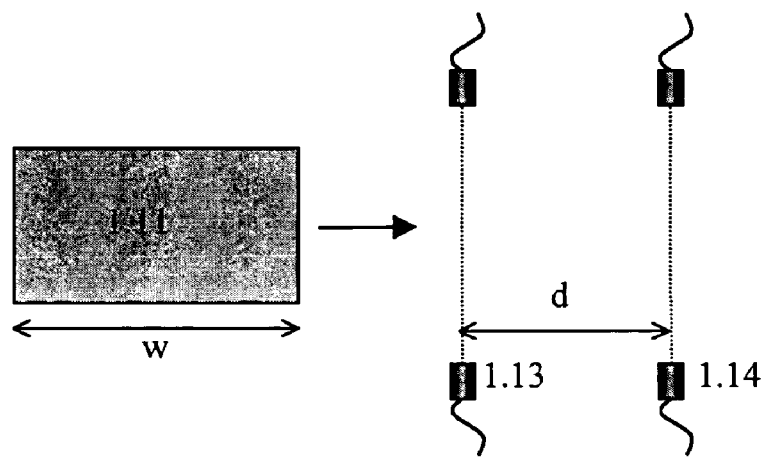
FIG. 1 illustrates a two-sensor system for a moving object of size w moving in a forward direction past two sensors in accordance with one embodiment of the invention.

FIG. 1 shows an object 1.11 of width w moving in a forward, left to right direction and will past the two sensors 1.13 and 1.14.

FIG. 2 shows typical timing signals for a two-sensor system as illustrated in FIG. 1. The timing signals seen in FIG. 2 is that of a rising edge state of sensor S2 2.14 while sensor S1 2.13 is in an on state followed a falling edge state of sensor S1 while sensor S2 is in an on state.

In reality, the programmable logic controller (PLC) or processor used in one embodiment of this invention receives signals essentially simultaneously from all the sensors connected to it. For the two-sensor algorithm, the processor compares signals from each sensor, treating the sensors as both the first and second sensors for these pairs of sensors.

For the triplet sensor algorithm, each sensor, with the exception of the first and last sensors of the series along the passageway, has the capability of acting simultaneously as first, second and third sensors of adjacent sensor triplets. The processor is also essentially receiving and processing the signals simultaneously from all the sensors of the series in this algorithm.

The processor in this embodiment of the present invention receives signals every five milliseconds or two hundred times a second. PLCs with other processing speeds or capabilities may be used without departing from the scope or spirit of the present invention.

For this consideration of the sensor sets, the number of sensor sets possible for either the two or three-sensor systems, is given by the formula (number of sensors in series minus (number of sensors considered by algorithm minus one)).

Thus, a series of eight sensors, when used in the paired-sensor algorithm, will yield seven (8–(2–1)) sets of paired sensor sets. The same series of eight sensors, when applied in the triplet-sensor algorithm, will yield six (8–(3–1)) triplet sensor sets.

The characteristics of the intersecting signals from these sensor sets for other situations will be described for each sensor system.

Figure 3:
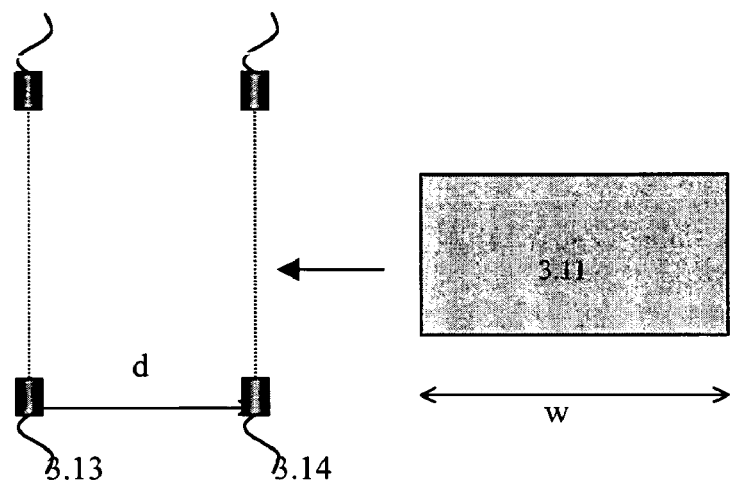
FIG. 3 illustrates a two-sensor system for a moving object of size w moving in a reverse direction, past the two sensors.
Figure 4:
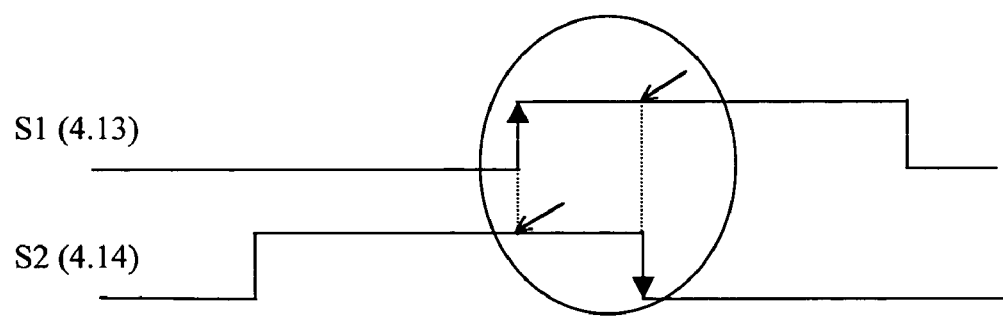
FIG. 4 the timing diagram for a two-sensor system showing the characteristic signals generated by the two sensors for an object described in FIG. 3.

FIGS. 3 and 4 are the sensor layout and typical timing diagram, respectively, for a two-sensor system where an object 3.11, wider than the interval between adjacent sensors, is moving in the reverse (right to left) direction.

In this situation, sensor S1 4.13 signals a rising edge state while sensor S2 4.14 is on and S2 signals a falling edge state while sensor S1 is on. It should be kept in mind that each sensor in a sensor set is simultaneously viewed as both a first or second sensor by the processor.

Figure 5:
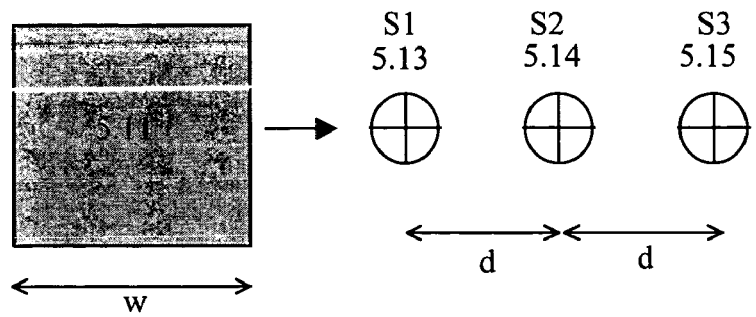
FIG. 5 illustrates a three-sensor system for a moving object moving in a forward direction past three sensors set at a fixed distance d apart.
Figure 6:
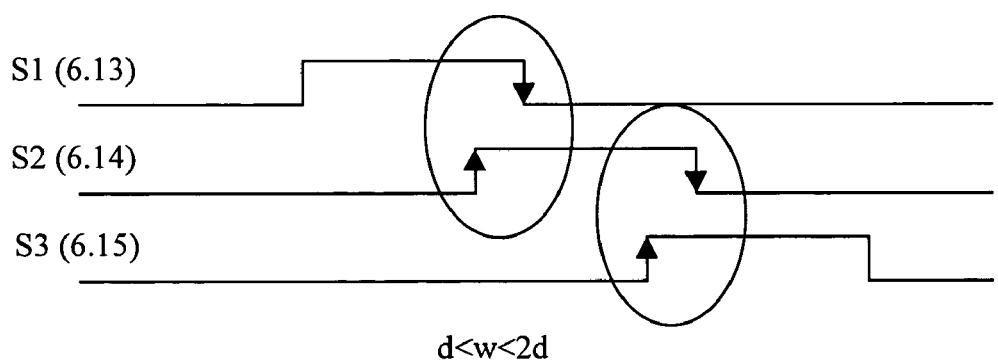
FIG. 6 and FIG. 7 are the timing diagrams for a three-sensor system showing the characteristic signals generated by the three sensors for an object moving in a forward direction; with FIG. 6 showing the timing traces for an object with size w where $d<w<2d$
Figure 7:
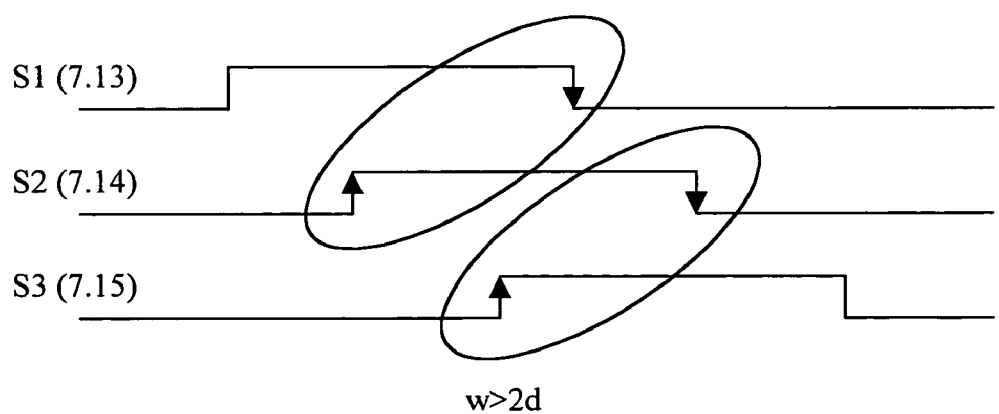

FIG. 5 is the timing sensor layout for a three-sensor system for an object 5.11 moving in a forward (left to right) direction. FIG. 6 is the timing diagram for an object or person whose width is more than d, the interval between adjacent sensors but less than 2d. FIG. 7 is the timing diagram for an object wider than 2d moving in the forward direction.

Again, the intersections of the signal states of the three sensors in the sensor set yield information regarding the person moving along the sensors. Two situations pertaining to the width w of the person (or object) in relation to d, the interval between adjacent sensors is discussed: that when d<w<2d and when 2d<w.

The timing diagram FIG. 6 (where d<w<2d) is similar to that of a two-sensor system (FIG. 2) with the exception of an additional signal from sensor S3 6.15 which gives a rising edge state after sensor S1 6.13 yields a falling edge state and returns to an off state but before the on signal from sensor S2 6.14 gives a falling edge state and returns to the off state. The on states of sensors S1 and S3 do not overlap.

This is contrasted with the timing diagram of FIG. 7 where the width w of the person is greater than 2d. Note that sensor S1 7.13 is still in an on state while a rising edge state is sent from sensor S3 7.15. The on states of sensors S1 and S3 overlap when sensor S2 7.14 is still on for an object whose width is greater that twice the interval between sensors (w>2d).

Figure 8:
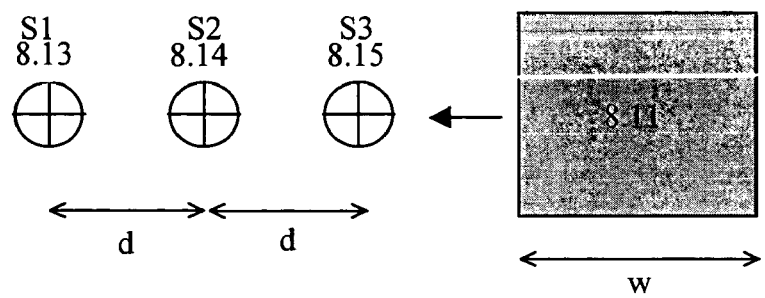
FIG. 8 illustrates the three-sensor system for a moving object of size w moving in a reverse direction past three sensors S3, S2 and S1 set at a fixed distance d apart.
Figure 9:
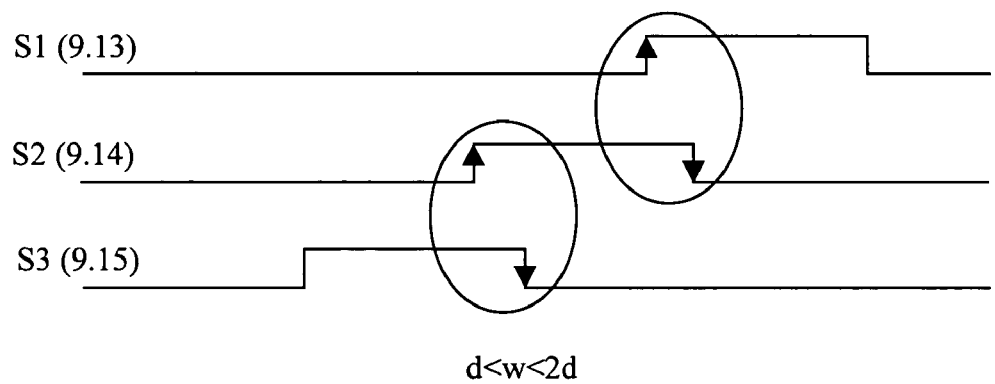
FIG. 9 and FIG. 10 are the timing diagrams for a three-sensor system showing the characteristic signals generated by three sensors for an object, moving in a reverse direction; with FIG. 9 showing the timing traces for an object with size w where $d<w<2d$
Figure 10:
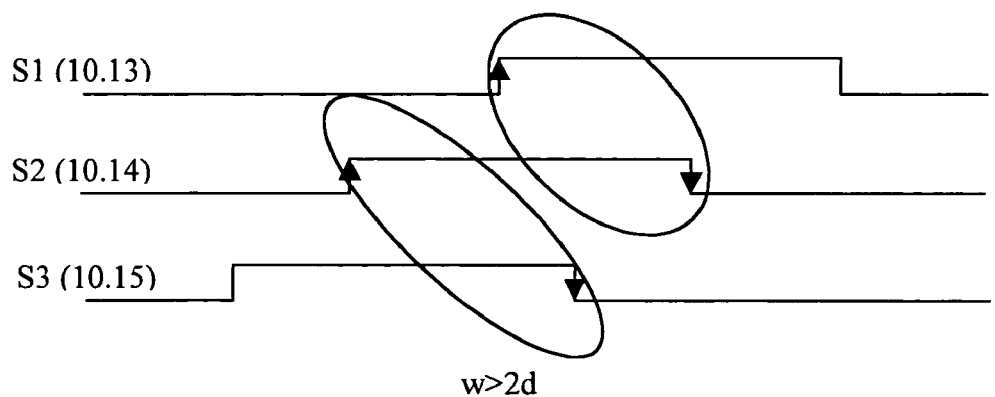

FIG. 8 is the sensor layout diagram for an object or person of width w moving in reverse (right to left) direction in a three-sensor system. The timing diagrams FIG. 9 (when d<w<2d) and FIG. 10 (when w>2d) are essentially the mirror images of the situation for an object moving in the forward direction. Note also the different overlap patterns between the on states of sensors S1 and S3 for the different widths of the person in FIGS. 9 and 10.

Figure 11:
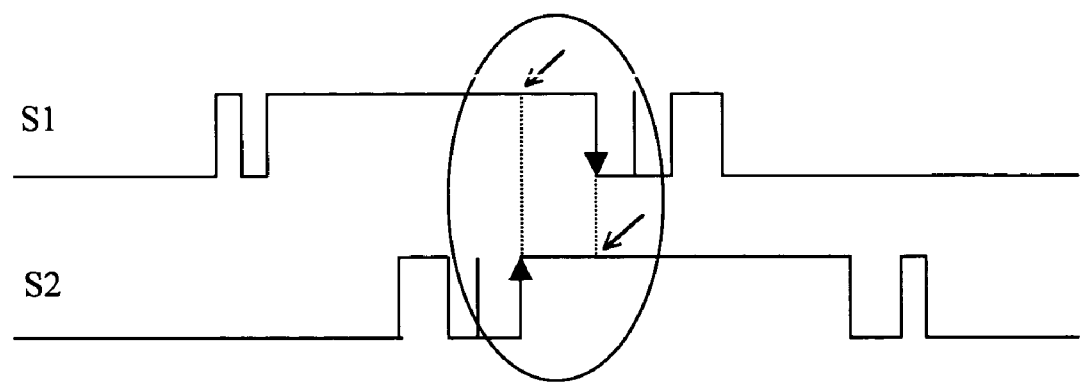
FIG. 11 is a typical timing diagram of a real life situation where there are small spikes caused by small objects such as the swinging arm and hand of the person moving in the passageway, superimposed on the theoretical timing diagrams.

The robustness of the present invention may be seen in FIG. 11, an actual timing diagram from experiments with two-sensor systems for a single person moving in a forward direction. The characteristic overlaps in signals are seen despite the presence of some spikes or brief on states generated by small objects such as a swinging arm and hand.

The robustness of the algorithm is retained as the spikes generated by the small objects merely superimpose over the characteristic intersecting states of signals and the processor is still able to determine the movement characteristics of the moving object despite these interfering spikes.

Under high traffic conditions, a three-sensor system will be able to discriminate between people moving close together in the passageway.

The current position of the person may be determined by the intersection of states of signals of the sensors. By considering the intersections of signals from more than two sensors, the false positive signals from smaller objects such as swinging hands and arms will not be taken as the position of the object. Only an object of substantial size (relative to the interval between sensors) will be considered for position determination.

With the position (and hence distance moved along the series of sensors) of the person known, his speed may be simply determined by dividing distance covered between adjacent sensor sets over time. Thus, if need be, the system can resolve speed of the person between sensor sets. Resolution of both position and speed is of course in relation to d, the interval between adjacent sensors.

The present invention, particularly the three-sensor algorithm, can also detect two persons closely_apposed to each other moving together, one behind the other, along the passageway so as to underpay the fare.

It can be seen that the present invention is a novel method of determining the movement characteristics of an object or person moving along a row of sensors such as the size, direction, speed and position.

The two- and three-sensor algorithms are robust and are able to discriminate between small objects and people. By keeping the demands of the system simple but rigorous, the invention may be implemented with minimal apparatus and cost.

Once the characteristics of the moving object or person have been determined, the controller may then send signals to output devices such as data loggers and barriers according to predetermined rules.

The elegance and simplicity of this stand-alone system, however, does not preclude it from being scaled up or its capabilities increased by augmenting it with additional input and output devices, or to be connected to a computer to impart additional controls such as manual over-rides over these rather autonomous passageways.

The present invention may also be used in counting or sorting objects of different sizes by directing them to different passageways, monitoring the movement of inanimate objects such as manufactured items on a conveyor system in a production line or to control access in restricted high-security areas.

It will be appreciated that although one preferred embodiment has been described in detail, various modifications and improvements may be made by a person of ordinary skill in the art, without departing from the scope of the present invention.

One such embodiment may be to have sensors at close intervals and to consider signals not from immediately adjacent sensors but from neighboring sensors, two or more intervals away. Such an embodiment still essentially makes use of the same algorithms and inventive step behind the present invention.

Elaborations and variations may be made and added to the present invention to improve its capabilities. These may include, but are not limited, to the following examples: connection to a central computer for higher processing, addition of manual over-ride controls and output to indicator systems.

Thus the present invention provides a method and system for tracking moving objects, particularly people in mass transit systems, that overcomes or at least reduces the problems of the prior art in which mechanical sensors, cameras or computer vision are used.

What is claimed is:

1. A system for determining position, speed, direction and size of an object in motion, comprising:
    at least two sensors at fixed intervals between each other in at least one sensor arrangement;
    at least one processor; and
    at least one outcome device;
    wherein said at least two sensors send input signals to said at least one processor;
    wherein said at least one processor receives input signals from a series of said at least two sensors set at a fixed distance relative to each other, analyzes input signals from pairs of adjacent sensors of said at least two sensors from said at least one arrangement; and send output signal to said at least one outcome device; and
    wherein said at least one outcome device performs at least one action according to a set of predetermined rules;
    further wherein said at least one processor is able to treat either sensor of each sensor pair as the first or second sensor of said pairs of sensors, and analyzes said signals from said sensor pairs to sense objects in motion along said series of sensors; and
    further wherein said at least one processor analyzing state of input signals from said pairs of sensors to determine the directions, positions along said series of sensors, speeds, sizes, and numbers of said objects in motion, said sizes of said objects being relative to said fixed distance between adjacent sensors.

2. A system according to claim 1, wherein said fixed interval between adjacent sensors may be from 16 to 30 cm.

3. A system for determining position, speed, direction and size of an object in motion, comprising:
    at least two sensors at fixed intervals between each other in at least one sensor arrangement;
    at least one processor; and
    at least one outcome device;
    wherein said at least two sensors send input signals to said at least one processor;
    wherein said at least one processor receives input signals from a series of said at least two sensors set at a fixed distance relative to each other, analyzes input signals from pairs of adjacent sensors of said at least two sensors from said at least one arrangement; and send output signal to said at least one outcome device; and
    wherein said at least one outcome device performs at least one action according to a set of predetermined rules;
    further wherein said at least one processor is able to treat either sensor of each sensor pair as the first or second sensor of said pairs of sensors, and analyzes said signals from said sensor pairs to sense objects in motion along said series of sensors; and
    further wherein said at least one processor sending output signals to at least one outcome device based on said directions, said positions, said speeds, said relative sizes, and said numbers of said objects in motion.

4. A method of determining properties of an object moving in a path, said path being monitored by a series of sensors, said method comprising:
    receiving signals from said series of sensors as said object passes by each of said series of sensors; wherein said series of sensors is in a substantially linear arrangement;
    processing said signals from pairs of adjacent sensors of said series of sensors; wherein each sensor acting simultaneously as the second sensor for a sensor pair and as the first sensor for the next sensor pair, except for the first and last sensor in said series of sensors; and
    analyzing states of said signals with respect to time to determine speed, direction, position and size of said object;
    wherein said processing step further comprising:
    analyzing signals from said pairs of adjacent sensors, whereby the direction of said object is forward if the second sensor of each of said sensor pair detects a rising edge state while the first sensor of each of said sensor pair is in an on state; thereby said second sensor remaining in on state until said first sensor returns to an off state, and said sequential pairs of sensors displaying this pattern of signals in said direction of objection;
    wherein said object has just cleared the first sensor; and
    wherein the width (w) of said object is greater than interval (d) between sensors.

5. A method of determining properties of an object moving in a path, said path being monitored by a series of sensors, said method comprising:
    receiving signals from said series of sensors as said object passes by each of said series of sensors; wherein said series of sensors is in a substantially linear arrangement;
    processing said signals from pairs of adjacent sensors of said series of sensors; wherein each sensor acting simultaneously as the second sensor for a sensor pair and as the first sensor for the next sensor pair, except for the first and last sensor in said series of sensors; and analyzing states of said signals with respect to time to determine speed, direction, position and size of said object;

wherein said processing step further comprises:

analyzing signals from said pairs of adjacent sensors, whereby the direction of said object is reverse if the first sensor of each of said sensor pair detects a rising edge state while the second sensor of each of said sensor pair is in an on state, thereby said first sensor remaining in an on state until said second sensor returns to an off state, and said sequential pairs of adjacent sensors displaying this pattern of signals in said direction of said object;

wherein said object has just cleared second sensor; and wherein the width (w) of object is greater than interval (d) between sensors.

6. A system for determining size, position, speed and direction of an object in motion, comprising:

at least three sensors at fixed intervals between each other in at least one sensor arrangement;

at least one processor; and at least one outcome device;

wherein said at least three sensors sending input signals to said at least one processor; said at least one processor analyzing input signals from triplets of three adjacent said sensors from said at least one sensor arrangement; said at least one processor sending output signal to said at least one outcome device; and said at least one outcome device performing at least one action according to a set of predetermined rules;

wherein said at least one processor receiving input signals from a series of at least three sensors set at a fixed distance relative to each other; and three adjacent said sensors forming a sensor triplet; and wherein said at least one processor is capable of: processing each sensor in said series of sensors as either the first, second or third sensor of said sensor triplets, and analyzing signals from said triplets of sensors to sense objects in motion along said series of sensors.

7. A system according to claim 6, wherein said at least one processor analyzing state of input signals from said triplets of sensors to determine the directions, positions along said series of sensors, speeds, sizes, and numbers of said objects in motion, said sizes of said objects being relative to said fixed distance between adjacent sensors.

8. A system according to claim 6, wherein said at least one processor sending output signals to at least one outcome device based on said directions, said positions, said speeds, said relative sizes, and said numbers of said objects in motion.

9. A system according to claim 6, wherein said fixed interval between adjacent sensors may be from 16 to 30 cm.

10. A method of determining properties of an object moving in a path, said path being monitored by a series of sensors, said method comprising:

receiving signals from triplets of adjacent said sensors as said object passes by said sensors;

processing signals from said triplet of sensors; and analyzing states of said signals with respect to time to determine speed, direction, position and size of said object;

wherein each sensor is simultaneously as the first, second or third sensor for said sensor triplets;

wherein said sensors of said series of sensors are in a substantially linear arrangement; and wherein said processing step further comprises analyzing signals from said triplets of sensors, whereby the direction of said object is forward if the first sensor senses said object and before second sensor; and whereby the second sensor senses said object before the third senor of said triplet of sensors.

11. A method according to claim 10, said processing step further comprises analyzing signals from said triplets of sensors, whereby
said object in motion in a forward direction,
object has just cleared second sensor
and
size of said object is greater than the interval between adjacent said sensors
but
less than twice the interval between adjacent said sensors,
when
first sensor signals an on state before second sensor signals an on state,
first sensor returns to an off state before third sensor signals a rising edge state
when
second sensor is in an on state,
said second sensor returning to an off state before said third sensor returns to an off state,
subsequent said triplets of sensors reiterating this pattern of signals in said direction of motion of said object.

12. A method according to claim 10, said processing step further comprises analyzing signals from said triplets of sensors, whereby
said object in motion in a forward direction,
object has just cleared second sensor
and
size of said object is greater than twice the interval between adjacent said sensors,
when
first sensor signals an on state before second sensor signals an on state,
first sensor returns to an off state only after third sensor signals a rising edge state
when
second sensor is in an on states
said second sensor returning to an off state before said third sensor returns to an off state,
subsequent said triplets of sensors reiterating this pattern of signals in said direction of motion of said object.

13. A method of determining properties of an object moving in a path, said path being monitored by a series of sensors, said method comprising:

receiving signals from triplets of adjacent said sensors as said object passes by said sensors;

processing signals from said triplet of sensors; and analyzing states of said signals with respect to time to determine speed, direction, position and size of said object;

wherein each sensor is simultaneously as the first, second or third sensor for said sensor triplets;

wherein said sensors of said series of sensors are in a substantially linear arrangement; and wherein said processing step further comprises analyzing signals from said triplets of sensors, whereby the direction of said object is reverse if the third sensor senses said object before the second sensor, and whereby the second sensor senses said object before the first sensor of said triplet of sensors.

14. A method according to claim 13, said processing step further comprises analyzing signals from said triplets of sensors,
whereby
said object in motion in a reverse direction,
object has just cleared second sensor
and
size of said object is greater than the interval between adjacent said sensors
but
less than twice the interval between adjacent said sensors,
when
third sensor signals and on state before second sensor signals an on state,
third sensor returns to an off state before first sensor signals a rising edge state
when
second sensor is in an on state,
said second sensor returns to an off state before first sensor returns to an off state,
subsequent said triplets of sensors reiterating this pattern of signals in said direction of motion of said object.

15. A method according to claim 13, said processing step further comprises analyzing signals from said triplets of sensors,
whereby
said object in motion in a reverse direction,
object has just cleared second sensor
and
size of said object is greater than twice the interval between said sensors,
when
third sensor signals an on state before second sensor signals an on state,
third sensor returns to an off state only after first sensor signals a rising edge state
when
second sensor is in an on state,
said second sensor returning to an off state before said first sensor returns to an off state,
subsequent said triplets of sensors reiterating this pattern of signals in said direction of motion of said object.

16. A system for determining size, position, speed and direction of an object in motion, comprising:
a series of sensors at a fixed distance relative to each other;
at least one processor; and
at least one outcome device;
wherein said series of sensors send input signals to said at least one processor;
wherein said at least one processor is capable of processing signals from said series of sensors by selecting a reference sensor from said series of sensors and two or more neighboring sensors to form a group of signals, and analyzing said group of signals to sense an object in motion along said sensors, and sending signals to at least one output device based on characteristics of motion of said object; wherein said neighboring sensors not immediately adjacent to said reference sensor; and
wherein said at least one outcome device performs at least one action according to a set of predetermined rules.

* * * * *